(No Model.) 2 Sheets—Sheet 2.
W. HILLMAN.
VELOCIPEDE.
No. 311,320. Patented Jan. 27, 1885.
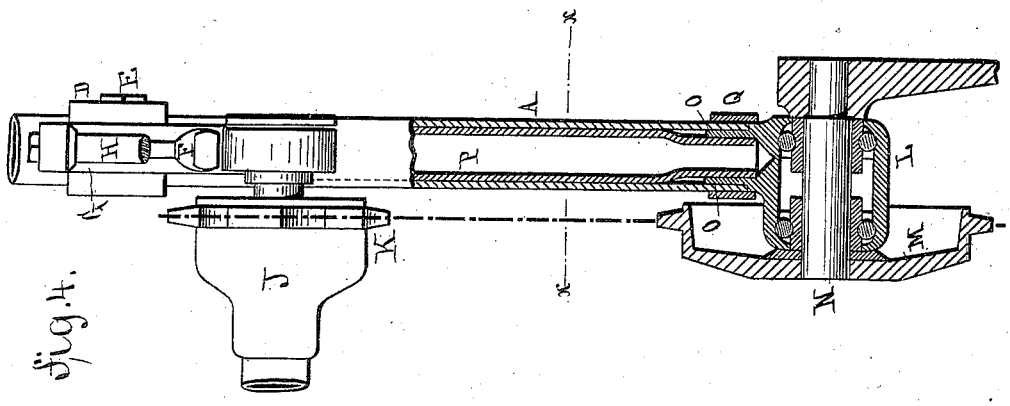
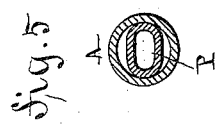
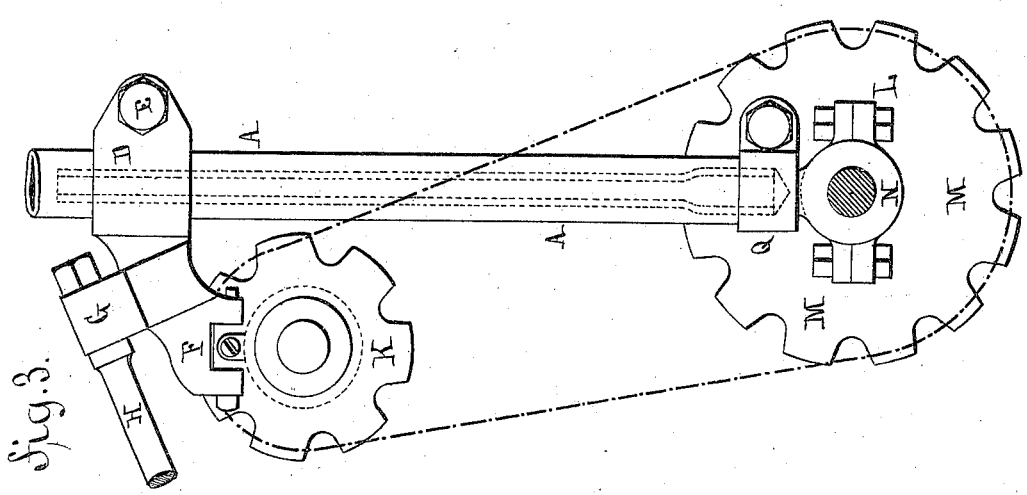
WITNESSES:
INVENTOR
William Hillman
BY
ATTORNEYS.

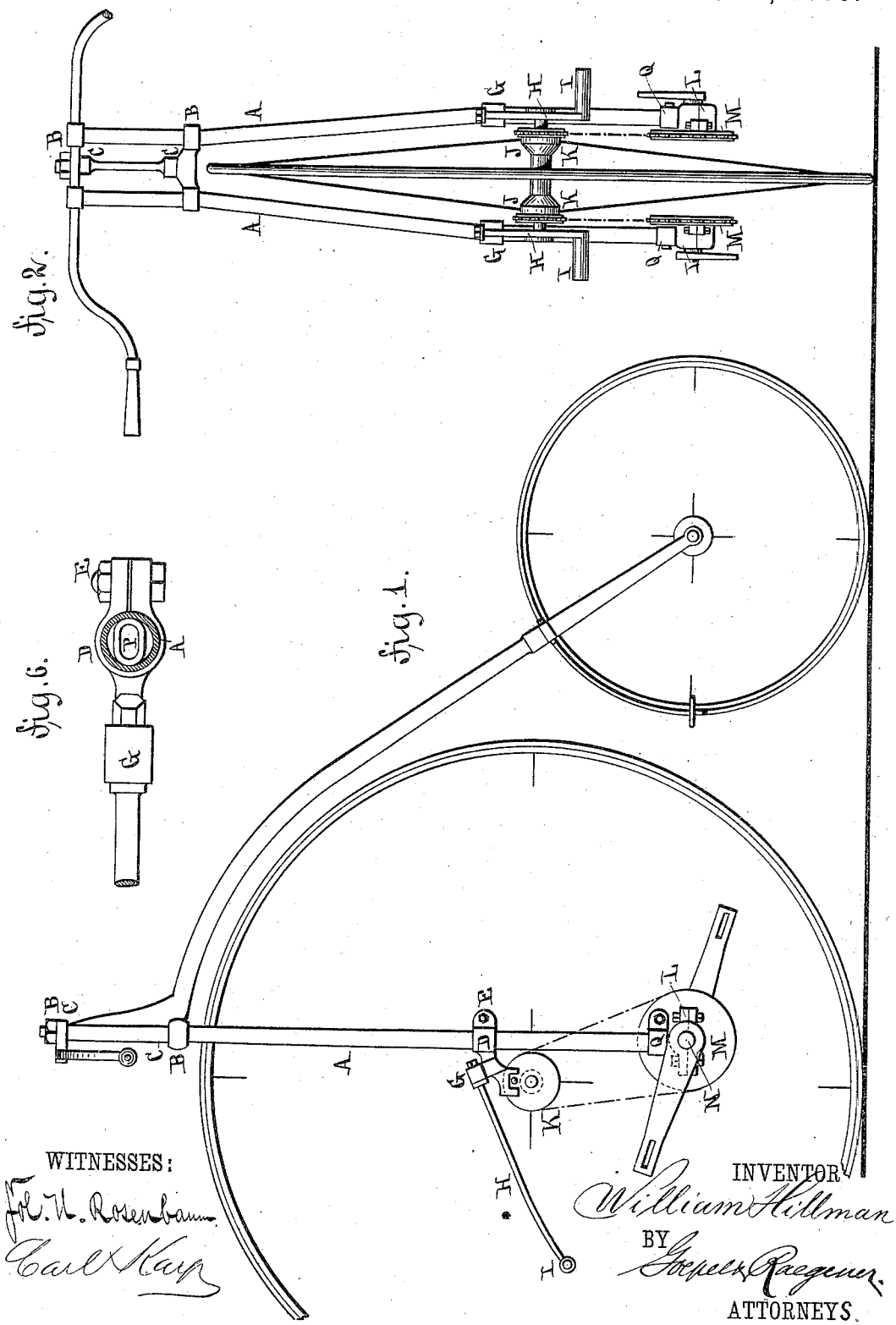

United States Patent Office.

WILLIAM HILLMAN, OF BINLEY ROAD, COVENTRY, ENGLAND.

VELOCIPEDE.

SPECIFICATION forming part of Letters Patent No. 311,320, dated January 27, 1885.

Application filed July 31, 1884. (No model.) Patented in England March 6, 1884, No. 4,478.

*To all whom it may concern:*

Be it known that I, WILLIAM HILLMAN, of Binley Road, Coventry, England, velocipede-manufacturer, have invented certain new and useful Improvements in Velocipedes, (for which I have received Letters Patent in Great Britain, No. 4,478, dated March 6, 1884,) of which the following is a specification.

This invention relates, chiefly, to improvements in that kind of velocipedes known as "safety-bicycles," in which pedal-axes are located near to the ground, so as to render the machine safer to ride and easier to mount and dismount without any loss of speed or power. The wheels are arranged as in the ordinary bicycle; but the driving-wheel is preferably made smaller and the trailing wheel somewhat larger than in the ordinary bicycle as used at present. The front fork is made of round pipe and extended on each side below the center or axis of the driving-wheel as near to the ground as the throw of the pedal-cranks will permit. In each end of the fork a long bearing is fitted, which carries the pedal-crank axles or shafts. The two tubes of the fork carry the treadles, and are connected together by brackets, which are brazed or secured thereto, and which carry the steering-centers, the upper brackets having adjusting-nuts. The pedal-crank axles have each on their outer ends the ordinary crank-levers and on their inner ends chain-pulleys, from which motion is communicated to corresponding chain-pulleys which are fast on the driving-wheel hub or its shaft. The driving-wheel shaft or axle runs in bearings which are fixed to adjustable and forward-projecting brackets secured to the legs of the fork. The brackets can be adjusted to any required position on the legs of the fork, so that any desired tension may be given to the chains on either side. The lower part of the legs of the fork—that is, from about the center of the driving-wheel to the pedal-shaft bearings—is stiffened by interior pipe-sections, which are brazed or otherwise fastened in such a way as to prevent the lateral spring of the legs of the fork when pressure is applied to the pedals. The brackets of the fork are provided with forward-extending rods having foot-rests which enable the rider to rest his legs when running downhill.

In the accompanying drawings, which illustrate my invention, Figure 1 represents a side elevation of my improved bicycle, in which the spokes, brake, saddle, &c., are not shown for simplifying the drawings. Fig. 2 is a front view of the same; Fig. 3, an enlarged side elevation of one side of the fork; Fig. 4, a front elevation of same, partly in section; Fig. 5, a section on line $x\,x$, Fig. 4; and Fig. 6, a plan of the split bracket.

Similar letters of reference indicate corresponding parts.

A A are the legs of the fork, which legs are brazed together by brackets B B, which also carry the steering-centers C C.

D D are the split brackets which encircle the legs A A, and which are clamped to the same by nuts E E, so that they can be adjusted at any height to tighten or slacken the driving-chains. The brackets D D carry at their solid ends F F the usual bearings for the driving spindle or hub. Each bracket D has a boss, G, at its top, through which are passed the rods H, that are secured by nuts and provided with foot-rests I at their ends. Thus the rider can stretch and rest his legs on running down a hill.

J J are the hubs of the wheel, secured to the spindle running in the aforesaid bearings.

K K are the upper chain-wheels, and L L the long bearings of the crank-spindles N N and lower chain-wheels, M M. The bearings L L are provided with tubular extensions O O, which are secured into the lower ends of the forks A A intermediately between the same and the interior stiffening-tubes, P P, which latter are fitted into the tubular extensions O O. Split brackets Q Q encircle the forks A A at their points of connection with the tubular extensions of the bearings, and so tighten up the whole.

By closely fitting the interior stiffening-tubes, P, into the legs of the fork A and lengthening the tubular extensions O O of the bearings L L, the said extensions may be made to telescope into the fork, if desired, and so further aid in adjusting the length of the chain. By widening the fork of the backbone it may be arranged to carry two small hind wheels instead of one, and so make the machine a tricycle. The stiffened frame can be adapted to other modes of transmitting power instead of cranks, such as by clutches put in action by the depression of lever-treadles. I am well aware that chain-driven bicycles with speed-gear and extended forks have been made heretofore; but they have proved unsatisfactory, owing to the want of lateral strength in the lower extensions of the fork, which are greatly stiffened by my construction.

Having thus described my invention, I claim as new and desire to secure by Letters Patent—

1. In a bicycle or like velocipede, the combination of the fork A and split brackets D, arranged to encircle and be adjusted on the fork A, and provided with bearings for the axle of the driving-wheel, substantially as set forth.

2. In a bicycle or like velocipede, the combination of a fork, A, and split brackets D D, attached to and made adjustable on the fork, said brackets being provided with bearings for the axle of the driving-wheel, and with forward-extending rods H H, having foot-rests I I at their outer ends, substantially as specified.

3. The combination of the extended fork A and bearings L L at the lower ends of the fork, said bearings having tubular extensions O and interior stiffening-tubes, P, substantially as and for the purpose described.

In testimony that I claim the foregoing as my invention I have signed my name in presence of two subscribing witnesses.

WILLIAM HILLMAN.

Witnesses:
C. NOWELL,
    *Leamington, Law Clerk.*
S. DOWSETT,
    *Leamington, Clerk.*